United States Patent
Frank et al.

(10) Patent No.: US 7,718,256 B1
(45) Date of Patent: May 18, 2010

(54) THERMAL INTERFACE MATERIAL FOR ELECTRONIC ASSEMBLIES

(75) Inventors: Paul P. Frank, Woodstock, MD (US); Kenneth C. Radford, Gambrills, MD (US); Karl F. Schoch, Jr., Catonsville, MD (US); Eileen M. Wojtal, Columbia, MD (US); Philip A. Panackal, Odenton, MD (US)

(73) Assignee: Northrop Grumman Corporation, Baltimore, MD (US)

( * ) Notice: Subject to any disclaimer, the term of this patent is extended or adjusted under 35 U.S.C. 154(b) by 67 days.

(21) Appl. No.: 11/397,799

(22) Filed: Apr. 5, 2006

(51) Int. Cl.
  *B32B 7/12* (2006.01)
(52) U.S. Cl. ........................ 428/343; 428/354
(58) Field of Classification Search ............... 428/343, 428/354
  See application file for complete search history.

(56) References Cited

U.S. PATENT DOCUMENTS

| | | | |
|---|---|---|---|
| 4,842,911 A * | 6/1989 | Fick | 428/40.4 |
| 5,213,868 A * | 5/1993 | Liberty et al. | 428/131 |
| 5,781,412 A | 7/1998 | de Sorgo | |
| 5,953,210 A | 9/1999 | Lo | |
| 6,046,907 A | 4/2000 | Yamaguchi | |
| 6,054,198 A | 4/2000 | Bunyan et al. | |
| 6,315,038 B1 | 11/2001 | Chiu | |
| 6,333,551 B1 * | 12/2001 | Caletka et al. | 257/707 |
| 6,432,497 B2 | 8/2002 | Bunyan | |
| 6,644,395 B1 | 11/2003 | Bergin | |
| 6,707,671 B2 | 3/2004 | Yamashita et al. | |
| 6,771,505 B2 | 8/2004 | Thyzel | |
| 6,791,839 B2 | 9/2004 | Bhagwagar | |
| 6,856,076 B2 | 2/2005 | Kim et al. | |
| 7,256,065 B1 * | 8/2007 | Too et al. | 438/106 |
| 2003/0107874 A1 | 6/2003 | Feigenbaum et al. | |
| 2004/0118551 A1 | 6/2004 | Czubarow et al. | |
| 2005/0116336 A1 * | 6/2005 | Chopra et al. | 257/720 |

OTHER PUBLICATIONS

Liotine, Frank Jr., et al, Thermal Management Performance and Attachment Reliability Using Urethane Film Adhesives, IMAPS, Sep. 2000.

* cited by examiner

*Primary Examiner*—Victor S Chang
(74) *Attorney, Agent, or Firm*—Andrews Kurth LLP

(57) ABSTRACT

Thermal interface materials are essential for proper operation of electronic assemblies. They are used between surface mount components and printed wiring boards and between printed wiring boards and metal heat sinks. Their function is to bond the components together and allow good heat transfer between the parts being bonded. The approach disclosed in this invention is a fully-cured, flexible, filled elastomer that is coated on both sides with a partially cured, filled adhesive, which can be conveniently made by a low cost tape casting process. This unique approach offers a combination of good adhesion to both bonding surfaces, good heat transfer, compliance to accommodate mismatched coefficient of thermal expansion, rework capability, control of flow of the adhesive during cure, and easy handling of uncured material.

28 Claims, No Drawings

THERMAL INTERFACE MATERIAL FOR ELECTRONIC ASSEMBLIES

FIELD OF THE INVENTION

The field of the present invention generally pertains to adhesives used in electronic assemblies. More particularly, the field of the present invention relates to partially cured, and fully cured, thermosetting resins that are filled with a thermally and/or electrically conductive filler, for electronic packaging applications.

BACKGROUND OF THE INVENTION

Thermal interface adhesives are essential for proper operation of electronic assemblies. They are often used between surface mount components and printed wiring boards, and between printed wiring boards and metal heat sinks. Their main function is to bond the components together, and allow good heat transfer between the parts that are bonded. Typically, they should exhibit a combination of good adhesion, good heat transfer, compliance to accommodate any mismatch in coefficient of thermal expansion (CTE) of the parts being bonded, flow control to obviate adhesive contamination onto adjacent sensitive hardware features, and rework capability. In certain cases an electrically insulating, thermally conducting interface material is needed, whereas in other cases an electrically and thermally conducting material is required. The appropriate filler material in the interface adhesive layer must be selected.

Materials normally used for this application include thermosetting resins filled with a thermally conductive filler. For example, epoxies filled with silver or aluminum oxide. One presently available material is a thermoplastic film coated on both sides with a filled thermosetting adhesive. This system is typically very rigid after curing, and does not accommodate materials having widely different coefficients of thermal expansion (CTE). This approach also does not permit removal of the cured adhesive. Moreover, the thermal conductivity of the bond layer is not very high because the thermoplastic does not include a thermally conductive filler.

In order to apply these materials, it is important to control the flow characteristics of the material during cure. Generally, the material will go through a period of very low viscosity while it is being heated to the final cure temperature, but before it is fully cured. At this time there may be excessive flow of the material into undesired areas, and/or separation of the conductive filler from the resin phase. Neither outcome is desirable.

Thus, there is a need in the art for adhesive systems that offer rework capability in combination with good adhesion, good heat transfer, and that maintain good performance over a wide temperature range.

SUMMARY OF THE INVENTION

The present invention is directed to a thermal interface adhesive that comprises a fully cured, flexible, filled elastomer, and a filled adhesive, which is coated on the fully cured elastomer. The filled adhesive may be partially cured in order to control its flow characteristics.

In a preferred embodiment, the filled elastomer layer is formed by tape-casting. Preferably, the tape casting is accomplished from a solvent-borne slurry. This low-cost approach provides a combination of good adhesion to both bonding surfaces, good heat transfer, the ability to accommodate materials with mismatched coefficients of thermal expansion, control of flow of the adhesive during cure, and easy handling. Furthermore, the tape casting method permits economical fabrication of large areas. The filled adhesive is then applied to both sides of the cured tape.

Preferred elastomer materials include silicones, fluorosilicones, polyurethanes, and epoxies. Preferred materials for the adhesive include fluorosilicones, silicones, epoxies, siliconized epoxies and cyanate esters. Preferred thermally conducting fillers include boron nitride, aluminum nitride, alumina, as well as diamond powder. Preferred electrically conducting fillers include gold, silver, and also nickel, copper and aluminum. Particle size and surface area are among the properties of the fillers that must be carefully controlled in order to achieve the desired properties in the final material and in order to achieve the required processing characteristics. In addition to standard filler morphologies, nanotube fillers may be desirable in some applications because of their generally high strength and anisotropic properties. Organic-inorganic hybrid materials, such as the silsesquioxanes, may also be desirable fillers because they incorporate the attractive properties of the inorganic materials and good compatibility with the polymer matrix. To accomplish the filling, standard paste technology procedures are generally used.

DETAILED DESCRIPTION OF THE INVENTION

This invention is directed to an adhesive system comprising a fully cured, flexible, filled elastomer that is coated with a filled adhesive, which may be partially cured. The adhesive system can be used as a thermal interface bonding material for electronic assemblies.

The novel adhesive formulations of this invention provide a combination of good adhesion to both bonding surfaces; good heat transfer; the ability to accommodate materials with mismatched coefficients of thermal expansion (CTE); rework capability; good control of flow of the adhesive during cure; easy handling of uncured material; and low cost.

In a preferred embodiment, the adhesive system of the present invention is formed from an elastomer layer that is created by thin-film tape casting from a solvent-borne slurry. The filled adhesive is then applied to both sides of the cured tape. In another embodiment, the tape system is prepared with different adhesives on each side of the tape. This allows better control of processing, and final properties.

The range of elastomers and adhesives that are used allows for a wide variety of processing conditions, modulus, CTE, bond strength, and electrical properties in the final material. Good adhesion to the bonding surfaces is achieved by the appropriate choice of adhesive layers. Good heat transfer is accomplished by the appropriate choice of conductive filler, filler content, and selection of adhesive. Compliance to accommodate mismatched coefficient of thermal expansion, and rework conditions, is achieved by the appropriate selection of elastomer. The flow of the adhesive during cure, and the handling characteristics of the uncured material, are controlled by setting the thickness of the adhesive layer and its degree of cure.

A preferred method of preparation is to first formulate the elastomer layer in the form of a thin-film by tape casting from a solvent-borne slurry. This method involves casting of the filled polymer material, evaporating solvent, and then curing. The adhesive is applied to both sides of the cured tape, and then cured in a continuation of the same process. In another embodiment, the tape is rolled and stored for subsequent curing. In yet another embodiment the adhesive is applied to the cured tape in a just-in-time process. In this case, the filled tape may be stored indefinitely.

Tape casting procedures suitable for use with this invention are described, for example, in U.S. Pat. No. 2,966,719 to Park; U.S. Pat. No. 3,189,978 to Stetson; U.S. Pat. No. 3,192,086 to Gyurk; and U.S. Pat. No. 3,698,923 to Stetson and Gyurk. Each of these patents are herein incorporated herein by reference in their entirety. Some methods for mixing and dispersing fillers in polymers are described in chapter 20 in Z. W. Wicks, Jr. F. N. Jones and S. P. Pappas, *Organic Coatings Science and Technology,* 2nd edition, J. Wiley and Sons, New York, 1999, which is also incorporated herein by reference.

By separating the tape fabrication from the adhesive application, it is possible to provide a variety of adhesives on a single elastomer layer. By using combinations of coatings, a variety of advantageous results may be achieved. For example, larger scales may be obtained, more uniform systems may be created, and the thickness may be more easily varied and controlled.

Tape casting permits rolls of the tape to be made with a varied length and controlled thickness, with lengths of 1000 feet or more, and widths of 12 inches or more. This generates significant cost savings over batchwise casting of single pieces. For rework purposes, it is desirable to put a stronger adhesive on a side attached to a part likely to be discarded. This makes it easier to clean the surface being retained, and prepare it for bonding another piece. Here, the adhesive layers may be color-coded so that users know which side will have the stronger bond and which side will have the weaker bond.

Filling may be accomplished by a variety of procedures that are well known in the art. For example, standard paste technology procedures or ceramic tape casting protocols may be used. In one method, a material is dissolved in a solvent and the filler is added. After mixing and degassing, the entire system is allowed to dry. Amounts of filler may be varied over the range commonly used in the art. Filler amounts may be from about 5 wt % to about 60 wt % for an electrically insulating filler and up to 90 wt % for an electrically conductive filler. The preferred filler amount would be chosen in order to provide the desired combination of physical properties, such as thermal conductivity, flexibility, and thermal expansion characteristics, among others. More than one filler may be used in a particular fully cured elastomer, or adhesive. The fillers may be varied depending upon whether electrical conductivity is also desired. The filled elastomer is then cured using the appropriate curing conditions for the resin. This step is known in the art as "C" staging.

The coating of the adhesive layer may be accomplished by any of the methods generally known in the art. This would include, but is not limited to, roller coating, screen coating, dipping and spraying. The adhesive layer may be partially cured to at least about 40%, up to about 80%. Preferably, the partially cured adhesive is cured to about 60% to about 80%. Most highly preferred is a partially cured, adhesive layer that is cured to about 60%. Partial curing of a thermosetting material is known in the art as "B staging."

In addition to thermosetting materials, the adhesive layer could be a filled thermoplastic material. A thermoplastic adhesive would make rework particularly simple because the adhesive would melt and flow reversibly. Among suitable thermoplastic materials would be acrylics, polyolefins, and rubbers.

Examples of elastomers are silicones, fluorosilicones, epoxies, siliconized epoxies, cyanate esters, rubbers, cross-linked rubbers, and polyurethanes. Silicones are preferred, and fluorosilicones are especially preferred. Silicones and fluorosilicones offer the advantages of good flexibility at low temperatures, good thermal stability, and, in the case of fluorosilicones, good solvent resistance. Examples of filled adhesive coatings include silicones, siliconized epoxies, epoxies, and polyurethanes. Examples of thermally conductive fillers are alumina, aluminum nitride, boron nitride, silver, gold, or diamond. Particle size and surface area are among the properties of the fillers that must be carefully controlled in order to achieve the desired properties in the final material and in order to achieve the required processing characteristics. In addition to standard filler morphologies, nanotube fillers may be desirable in some applications because of their generally high strength and anisotropic properties. Organic-inorganic hybrid materials, such as the silsesquioxanes, may also be desirable fillers because they incorporate the attractive properties of the inorganic materials and good compatibility with the polymer matrix.

Fluorosilicones are especially preferred in this invention for both the elastomer layer and the filled adhesive. Fluorosilicones generally consist of fluorocarbons and siloxanes and may be siloxane backbone polymers, with fluorocarbon pendant groups. Fluorosilicones generally maintain good resiliency within a very wide temperature range (approximately –60 to 200° C.). They also typically have a low surface tension, low volatility, and excellent chemical inertness. Moreover, fluorosilicones have low glass transition temperatures, low brittle points, and generally do not crystallize at low temperatures. Thus, fluorosilicones combine the high thermal stability and low surface tension of fluoropolymers, with the high thermal stability, and good low temperature flexibility of silicones. Other desirable properties of both layers in this interface material are solvent resistance, especially resistance to fluids common in aerospace systems, low electrical loss, low ionic conductivity, and stability of properties during prolonged aging.

Generally, this invention encompasses a wide variety of fillers, elastomers, and adhesives, which may all be conveniently varied depending upon the requirements of a particular application. The following working example, is one embodiment of the present invention, and is given to further illustrate the invention. The working example is not intended to describe the full scope of the present invention. The invention is fully described by the claims provided below.

EXAMPLE

An example of this invention is an aluminum nitride-filled polyurethane coated on both sides with an aluminum nitride-filled epoxy. When cured for 2 hours at 121° C., the properties listed in the Table below are measured.

| | |
|---|---|
| CTE (ppm/° C.) | 150 below $T_g$ (glass transition); 261 above $T_g$ |
| Thermal decomposition | 400° C. |
| Thermal conductivity | 0.6 W/m-K, bonded |
| Transient modulus (psi) | 60,500 at –65° C.; 2,840 at room temperature 2,310 at 150° C. |
| Mechanical transitions | E' softening at –77° C. DMA thermal transitions at –60° C. and –13° C. TMA $T_g$ at 47° C. |
| Shear strength (psi) | 1,726 psi at –65° C. 383 psi at room temperature 302 psi at 150° C. No cracking or delamination of bonded ceramics |
| Rework | 125 to 150° C. |

We claim:

1. A thermal interface material comprising:
   a fully cured elastomer, filled with a thermally and/or electrically conductive filler, the fully cured elastomer comprising one or more resins selected from the group consisting of silicone, fluorosilicone, epoxy, siliconized epoxy, rubber, and cross-linked rubber; and
   partially cured adhesive, filled with a thermally and/or electrically conductive filler, the adhesive comprising one or more resins selected from the group consisting of silicone, fluorosilicone, siliconized epoxy, cyanate ester, and polyurethane;
   wherein the fully cured elastomer is substantially coated with the partially cured adhesive, wherein the fully cured elastomer is in the form of a tape prepared by tape casting, and wherein the partially cured adhesive is in direct contact with the fully cured elastomer and is cured to about 60% degree of cure.

2. A thermal interface material of claim 1, wherein the fully cured, filled elastomer is a silicone.

3. A thermal interface material of claim 1, wherein the fully cured, filled elastomer is a fluorosilicone.

4. A thermal interface material of claim 1, wherein the uncured or partially cured, filled adhesive is a siliconized epoxy.

5. A thermal interface material of claim 1, wherein the partially cured, filled adhesive is a silicone.

6. A thermal interface material of claim 1, wherein the uncured or partially cured, filled adhesive is a cyanate ester.

7. A thermal interface material of claim 1, wherein the uncured or partially cured, filled adhesive is a thermoplastic.

8. A thermal interface material of claim 1, wherein the conductive filler is thermally conductive.

9. A thermal interface material of claim 1, wherein the conductive filler is both thermally conductive and electrically conductive.

10. A thermal interface material of claim 1, wherein the conductive filler comprises boron nitride, aluminum nitride, alumina, silver, gold, nickel, copper, aluminum, diamond or mixtures thereof.

11. A thermal interface material of claim 10, wherein the conductive filler comprises nanotubes of conductive filler.

12. A thermal interface material of claim 10, wherein the conductive filler comprises a hybrid organic-inorganic filler.

13. A thermal interface material of claim 1 wherein the fully cured, filled, elastomer is coated with a combination of two or more partially cured, filled, adhesives.

14. A thermal interface material of claim 1, wherein the partially cured, filled, adhesive is coated on both sides of the tape.

15. A thermal interface material of claim 14, wherein each side of the fully cured, filled, elastomer tape is coated with a different uncured or partially cured, filled adhesive.

16. A thermal material of claim 14, wherein the fully cured, filled, elastomer tape is coated with a combination of two or more uncured or partially cured, filled adhesives.

17. A thermal interface material of claim 14, wherein the conductive filler comprises boron nitride, aluminum nitride, alumina, silver, gold, nickel, copper, aluminum, or diamond, or mixtures thereof.

18. A thermal interface material of claim 14, wherein the conductive filler comprises nanoparticles of boron nitride, aluminum nitride, alumina, silver, gold, nickel, copper, aluminum, diamond or mixtures thereof.

19. A thermal interface material of claim 14, wherein the fully cured, filled elastomer tape comprises a silicone.

20. A thermal interface material of claim 14, wherein the fully cured, filled elastomer tape comprises a fluorosilicone.

21. A thermal interface material of claim 14, wherein the partially cured, filled adhesive is a silicone.

22. A thermal interface material of claim 14, wherein the uncured or partially cured, filled adhesive is a siliconized epoxy.

23. A thermal interface material of claim 14, wherein the uncured or partially cured, filled adhesive is a cyanate ester.

24. A method of bonding two components together comprising:
    contacting a first component with a thermal interface material of claim 1 which comprises a fully cured, filled elastomer and an uncured or partially cured, filled adhesive;
    contacting a second component with the first component, on a side with the thermal interface material; and
    curing the partially cured, filled, adhesive;
    wherein the first component and the second component become bonded together upon the curing of the partially cured, filled adhesive.

25. A method of preparing a thermal interface material comprising the steps of:
    formulating a solvent-borne slurry comprising an elastomer and a thermally or electrically conductive filler;
    mixing the components, blending with a solvent, and degassing the resulting slurry;
    tape casting the solvent-borne slurry;
    evaporating the solvent from the solvent-borne slurry;
    fully curing the elastomer in the tape cast, filled, elastomer layer;
    applying one or more partially cured, filled, adhesives, to both sides of the fully cured elastomer tape.

26. The method of claim 25, wherein the partially cured, filled, adhesive is applied by roller coating, screen coating, or spraying.

27. The method of claim 25, wherein the tape casting is done with a length of 1000 feet or more, and with a width of 12 inches or more.

28. The product produced by claim 27, wherein the product has a uniform thickness and composition throughout the tape.

* * * * *